(12) United States Patent
Weisblatt et al.

(10) Patent No.: US 7,575,159 B2
(45) Date of Patent: Aug. 18, 2009

(54) POINT OF SALE INTEGRATOR

(75) Inventors: Karen Weisblatt, Austin, TX (US);
John Michael Adams, Austin, TX (US);
Michael Gray, Round Rock, TX (US);
Kuoyong Huang, Cedar Park, TX (US);
Brian Slaughter, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 551 days.

(21) Appl. No.: 11/400,847

(22) Filed: Apr. 10, 2006

(65) Prior Publication Data

US 2007/0235530 A1    Oct. 11, 2007

(51) Int. Cl.
*G06K 5/00* (2006.01)
(52) U.S. Cl. .............. 235/380; 235/383; 235/375; 235/381; 705/16; 705/25
(58) Field of Classification Search ........... 235/380, 235/375, 379, 381, 378; 902/22; 705/16, 705/21, 25
See application file for complete search history.

(56) References Cited

U.S. PATENT DOCUMENTS

| 4,877,947 | A | * | 10/1989 | Mori | 235/380 |
|---|---|---|---|---|---|
| 5,113,060 | A | | 5/1992 | Wike, Jr. et al. | 235/383 |
| 5,162,639 | A | | 11/1992 | Sugiyama | 235/383 |
| D365,595 | S | | 12/1995 | Trobert | D18/4 |
| 5,756,978 | A | | 5/1998 | Soltesz et al. | 235/380 |
| 5,859,779 | A | | 1/1999 | Giordano et al. | 364/479.01 |
| 6,073,838 | A | * | 6/2000 | Baitz et al. | 235/380 |
| 6,223,163 | B1 | | 4/2001 | Van Luchene | 705/1 |
| 6,598,024 | B1 | | 7/2003 | Walker et al. | 705/16 |
| 6,637,661 | B2 | | 10/2003 | Cohen et al. | 235/472.01 |
| D493,815 | S | | 8/2004 | Giordano et al. | D18/4.6 |
| 6,917,299 | B2 | | 7/2005 | Fu et al. | 340/686.1 |
| 2005/0283403 | A1 | * | 12/2005 | Ramirez et al. | 705/16 |
| 2006/0065724 | A1 | * | 3/2006 | Lum | 235/383 |
| 2009/0065585 | A1 | * | 3/2009 | Gerhard | 235/482 |

OTHER PUBLICATIONS http://www.mobileplanet.com/product.asp?code=120504; *Mobile Planet* "Enfora Treo 600 Wi-Fi Sled", printed Aug. 8, 2006 (2 pages).
http://www.detnews.com/2005/autosconsumer/0503/30/G03-133160.htm: *The Detroit News Drive* "Sliding Tray Eases Loading" Mar. 30, 2005 (2 pages).
http://www.ncr.com/en/media_information/2006/jul/pr071006.htm "NCR RealPOS™ 80 POS Terminal" Jul. 10, 2006 (2 pages).

* cited by examiner

*Primary Examiner*—Edwyn Labaze
(74) *Attorney, Agent, or Firm*—Hamilton & Terrile, LLP; Stephen A. Terrile

(57) ABSTRACT

A point of sale terminal is disclosed. The point of sale terminal includes a terminal housing with a controller portion and a cash drawer portion, a sliding sled coupled to the terminal housing residing within the controller portion of the terminal housing and between a first position and a second position wherein the first position is within the controller portion of the terminal housing and the second position is without the controller portion of the terminal housing, and a system controller coupled to the sliding sled such that when the sliding sled is without the controller portion of the terminal housing, the system controller is exposed for service.

12 Claims, 5 Drawing Sheets

POINT OF SALE INTEGRATOR

BACKGROUND OF THE INVENTION

1. Field of the Invention

The present invention relates to point of sale terminals and more particularly to keyboards of point of sale terminals.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an information handling system is a point of sale (POS) terminal. A point-of-sale terminal is a computerized replacement for a cash register. A point of sale terminal can include the ability to record and track customer orders, process credit and debit cards, connect to other systems in a network, and manage inventory. Generally, a point of sale terminal has as its core an information handling system, which is provided with application specific programs and I/O devices for the particular environment in which the point of sale terminal will serve. A point of sale system for a restaurant, for example, is likely to have all menu items stored in a database that can be queried for information in a number of ways. Point of sale terminals are used in most industries that have a point of sale such as retail stores, restaurants, and lodging.

Point of sale keyboards are often very expensive. There are two features that make point of sale keyboards unique to most retailers, most of the keyboards include a magnetic stripe reader/credit card reader (MSR) and some keyboards include reprogrammable/relegendable keys. This feature is waning driven partially by the availability of low cost touch screen solutions.

SUMMARY OF THE INVENTION

In accordance with the present invention, a point of sale terminal is provided which includes a keyboard assembly with modular MSR and a minimal edge keyboard. More specifically, the keyboard assembly includes a modular MSR and minimal edge keyboard as well as a keyboard housing (e.g., a plastic sled) which substantially exactly fits the space remaining on top of the cash drawer housing of the point of sale integrator, thus creating the illusion of an integrated solution, while preserving all of the benefits of a modular approach. The keyboard assembly also include a recess into which an MSR can be snapped from underneath the assembly. By providing a modular keyboard approach, the cost of a point of sale keyboard is dramatically reduced in environments where relegendable reprogrammable keys are not desired.

More specifically, in one embodiment, the invention relates to a point of sale terminal which includes a terminal housing, a keyboard assembly positioned over the cash drawer portion, and a system controller coupled to the keyboard assembly. The terminal housing includes a controller portion and a cash drawer portion. The keyboard assembly includes a keyboard and a keyboard assembly housing which is sized to substantially exactly fit over the cash drawer portion. The keyboard assembly defines a keyboard recess and a magnetic stripe reader recess. The keyboard fits snugly into the keyboard recess.

In another embodiment, the invention relates to an information handling system which includes a terminal housing, a keyboard assembly positioned over the cash drawer portion, and a system controller coupled to the keyboard assembly. The system controller includes a processor and memory. The terminal housing includes a controller portion and a cash drawer portion. The keyboard assembly includes a keyboard and a keyboard assembly housing which is sized to substantially exactly fit over the cash drawer portion. The keyboard assembly defines a keyboard recess and a magnetic stripe reader recess. The keyboard fits snugly into the keyboard recess.

In another embodiment, the invention relates to a keyboard assembly for use with a point of sale terminal. The keyboard assembly includes a keyboard and a keyboard housing sized to substantially exactly fit over a cash drawer portion of the point of sale terminal. The keyboard assembly defines a keyboard recess which the keyboard fits snugly into and a magnetic stripe reader recess.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
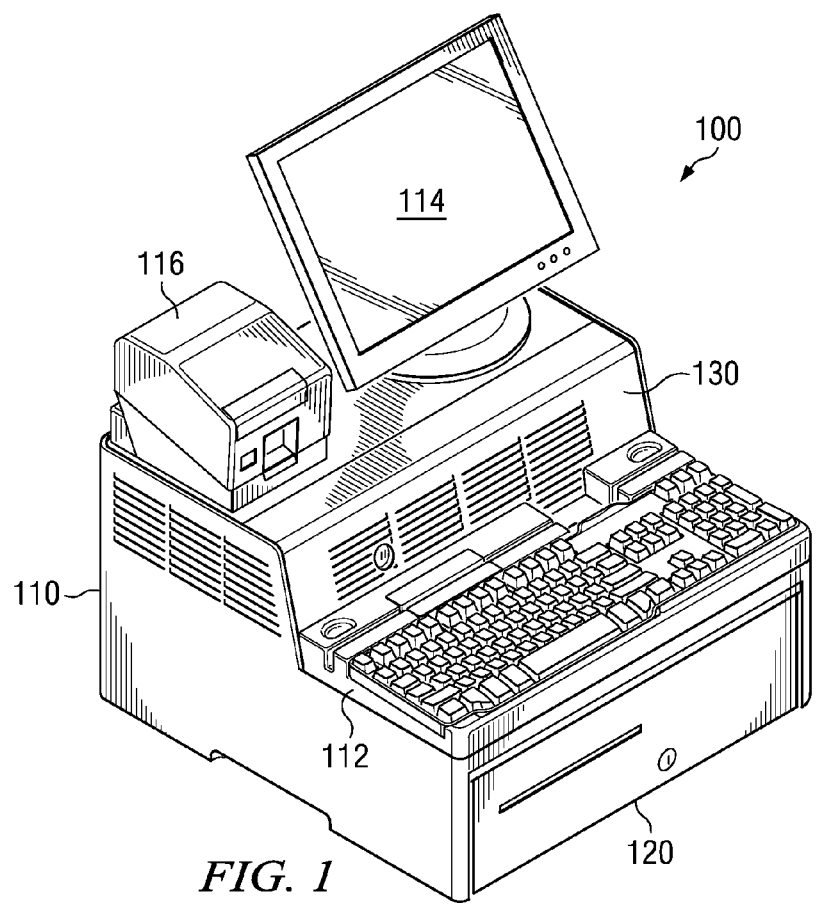
FIG. 1 shows a perspective view of a point of sale terminal in accordance with the present invention.

Referring to FIG. 1, a perspective view of a point of sale terminal 100 in accordance with the present invention is shown. More specifically, the point of sale terminal 100 includes terminal housing 110, a keyboard assembly 112, a monitor 114 and a printer 116. The housing 110 includes a cash drawer 120 as well as a removable face panel 130. The form factor of the terminal housing 110 is such that the monitor 114 and the printer 116 fit comfortably on top of the terminal housing 110. The keyboard assembly 112, monitor 114 and printer 116 are all electrically coupled with a point of sale controller system which is positioned within the terminal housing 110.

Figure 2:
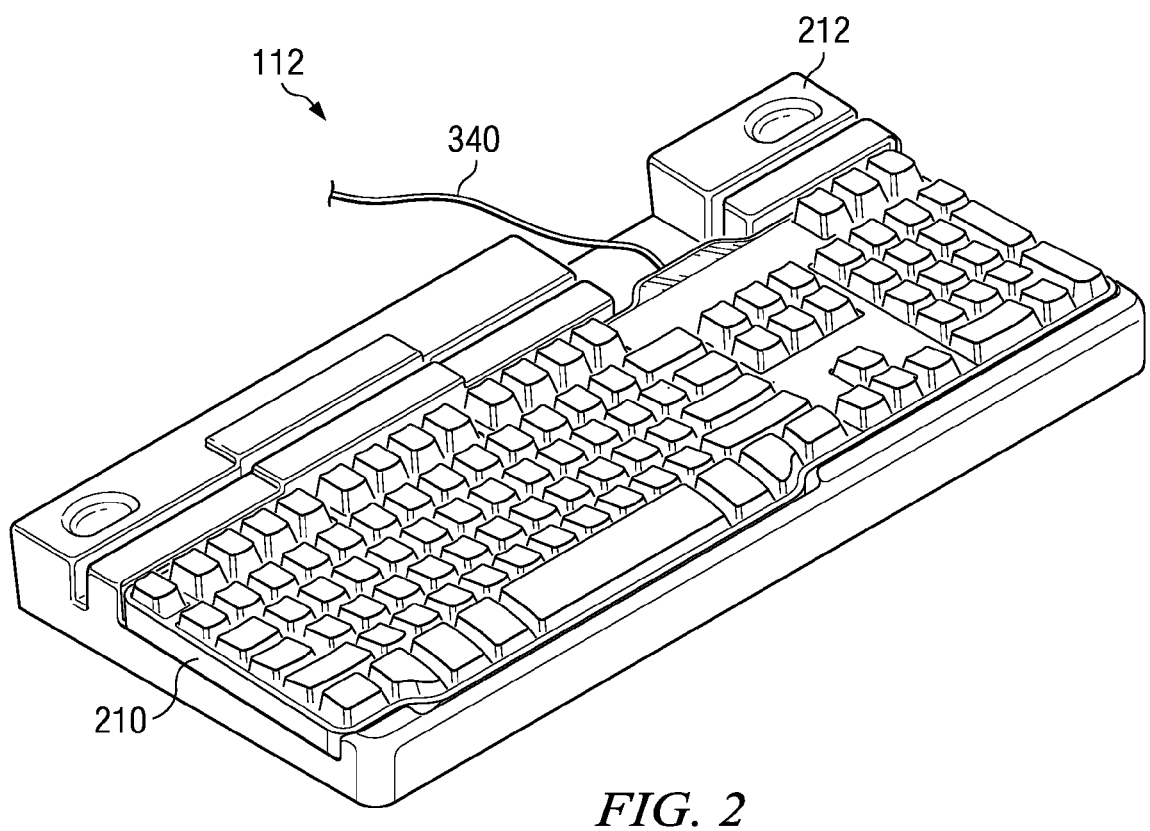
FIG. 2 shows a perspective view of a point of sale keyboard assembly.

Referring to FIG. 2, a perspective view of a point of sale keyboard assembly 112 is shown. The keyboard assembly 112 provides a modular point of sale keyboard solution. More specifically, the keyboard assembly 112 includes a minimal edge keyboard 210 and a keyboard assembly housing 212 into which the minimal edge keyboard 210 fits. The keyboard assembly 112 may also optionally include a modular MSR (shown in FIGS. 3 and 5). By providing an MSR function via an optional modular MSR, the keyboard assembly can be readily and inexpensively fabricated from preexisting, non-specialized parts. Additionally, the keyboard assembly 112 is even less expensive for customers that do not need (or do not wish to pay for) a MSR integrated within the keyboard assembly 112.

The keyboard assembly housing 212 is a sled (e.g., a plastic sled) which is sized to substantially exactly fit over a cash drawer portion of the terminal housing 110 of the point of sale integrator 100, thus creating an illusion of an integrated point of sale solution, while preserving all of the benefits of a modular approach. The keyboard assembly housing 212 also include a recess into which the MSR can be snapped from underneath the assembly.

Figure 4:
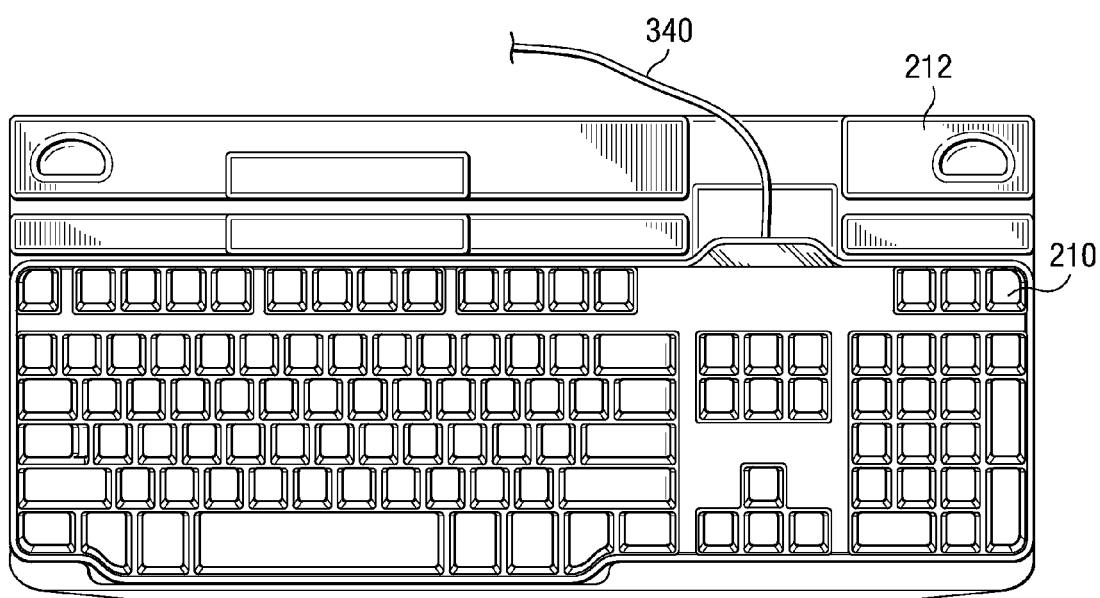
FIG. 4 shows a top view of a point of sale keyboard assembly.
Figure 3:
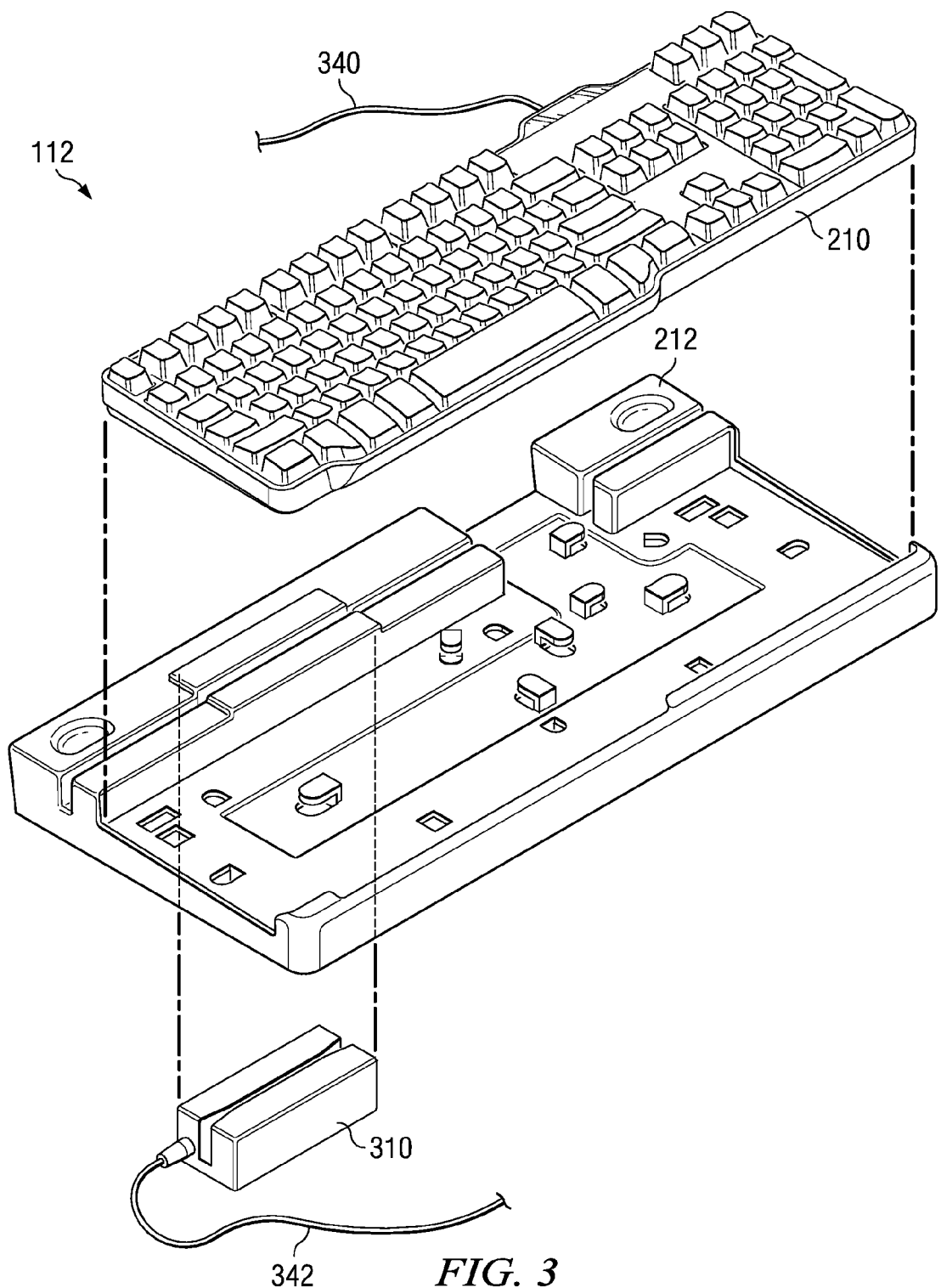
FIG. 3 shows an exploded view of a point of sale keyboard assembly.

FIG. 3 shows an exploded view of a point of sale keyboard assembly 112. FIG. 4 shows a top view of a point of sale keyboard assembly 112. The keyboard 210 fits snugly into a keyboard recess on the top of the keyboard assembly housing 212 and the MSR 310 fits into a recess on the bottom of the keyboard assembly housing 212. The keyboard assembly housing 212 includes cable management tabs for the keyboard cable 340 and the MSR cable 342. The MSR includes a condition indicator 350.

Figure 5:
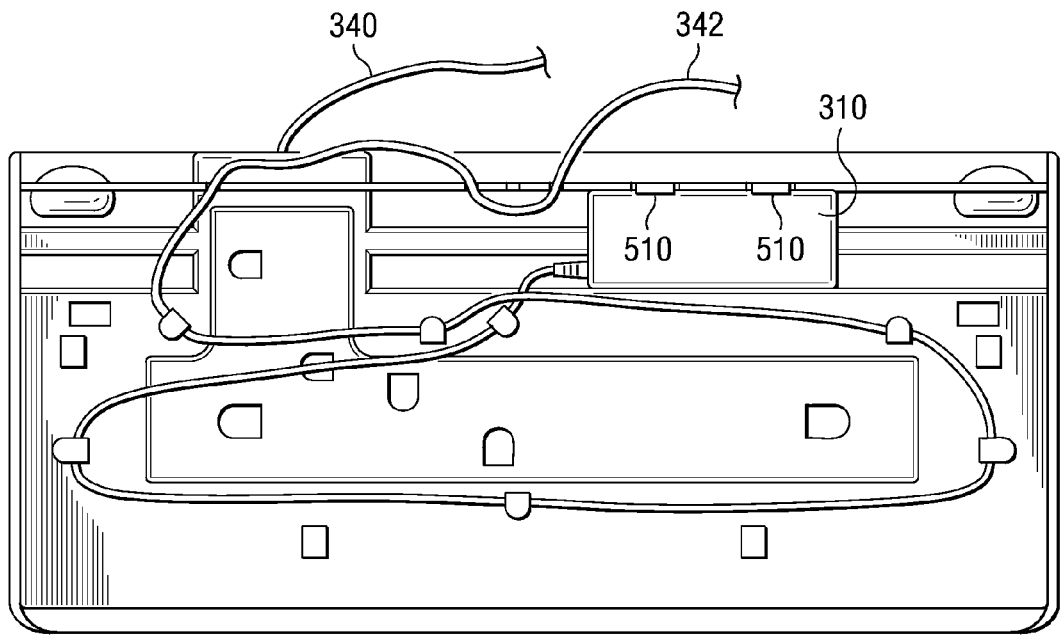
FIG. 5 shows a bottom view of a point of sale keyboard assembly.

FIG. 4 shows a top view of the point of sale keyboard assembly. FIG. 5 shows a bottom view of the point of sale keyboard assembly. The MSR 310 fits into the recess on the bottom of the keyboard assembly housing 212. The MSR 310 is held in place via tabs 510, which allow the MSR to be easily snapped into the recess. The MSR 310 may also be removed (e.g., for service) by applying outward pressure to the tabs 510.

Figure 6:
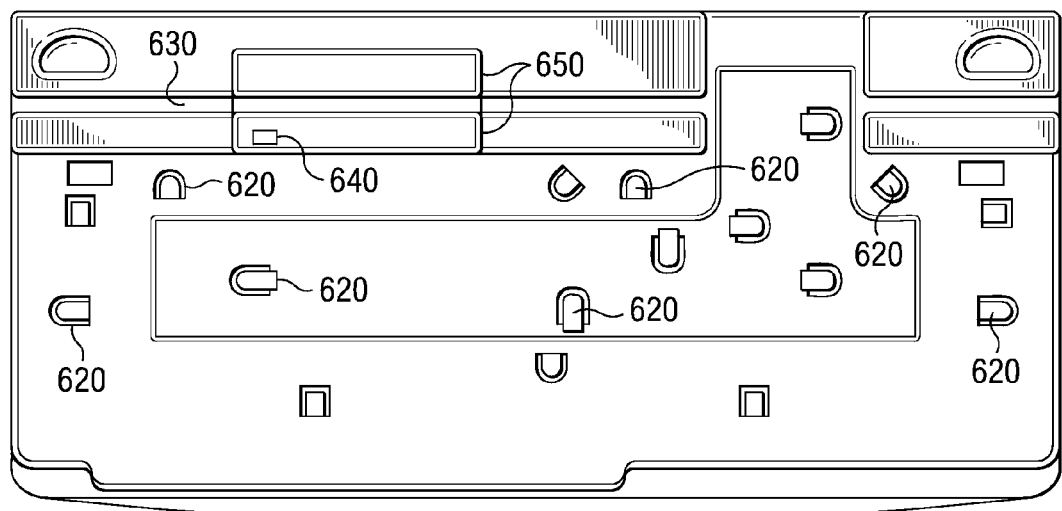
FIG. 6 shows a top view of a point of sale keyboard assembly housing.

FIG. 6 shows a top view of a point of sale keyboard housing 212. The keyboard housing 212 includes the recess 610 into which the keyboard 210 fits. The recess includes the plurality of tabs 620 which are arranged to provide a cable management function for the keyboard cable 340. The keyboard 210 is held securely in place by the cable management function when the keyboard cable 340 is routed around the tabs 620. The keyboard housing 212 also defines a card slot 630. The card slot 630 is positioned to allow a magnetically encoded card to be slid through the MSR 310. The keyboard housing 212 also defines a MSR indicator aperture 640. The MSR indicator aperture 640 is positioned to correspond to the condition indicator 350 located on the MSR 310, thus allowing the condition of the condition indicator 350 to be observed by an operator of the point of sale terminal 100. The keyboard housing 212 also includes MSR projections 650 which provide an operator with a visual and tactile indication of the position of the MSR 310 within the keyboard assembly 112.

Figure 7:
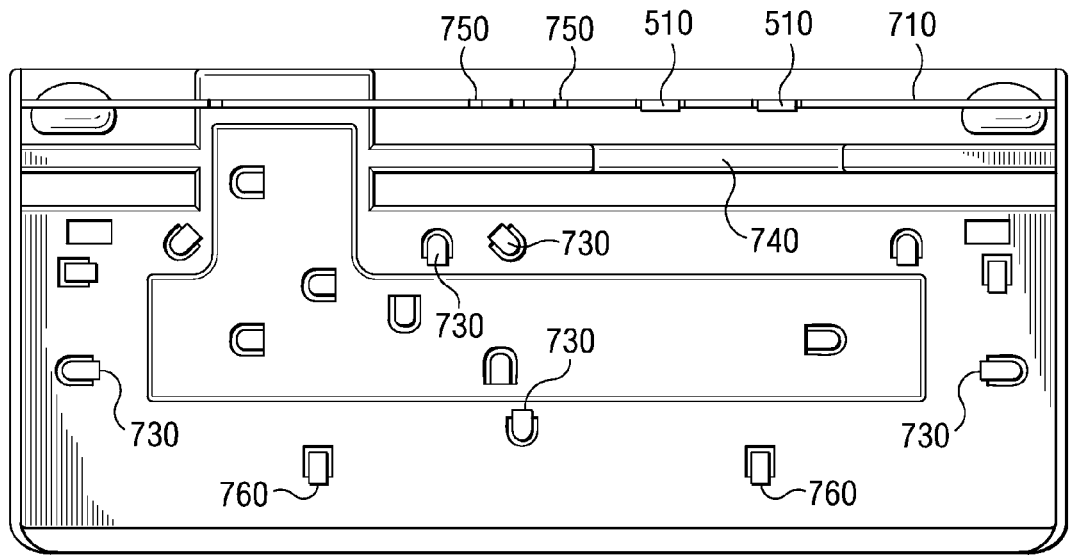
FIG. 7 shows a bottom view of a point of sale keyboard assembly housing.

FIG. 7 shows a bottom view of a point of sale keyboard housing. The keyboard housing 212 includes the recess 710 into which the MSR 310 fits. The recess includes the plurality of tabs 520 which hold the MSR securely in place. The keyboard housing also includes a plurality of tabs 730 which are arranged to provide a cable management function for the MSR cable 342. The keyboard housing 212 also defines a card aperture 740. The card aperture 740 is positioned to allow a magnetically encoded card which is slid through the slot 530 to access the MSR 310. The keyboard housing 212 also defines cable slots 750 via which the MSR cable 342 are routed to the controller system. The keyboard housing 212 also include attachment projections 760 via which the keyboard assembly 112 is attached to the point of sale terminal housing 110.

Figure 8:
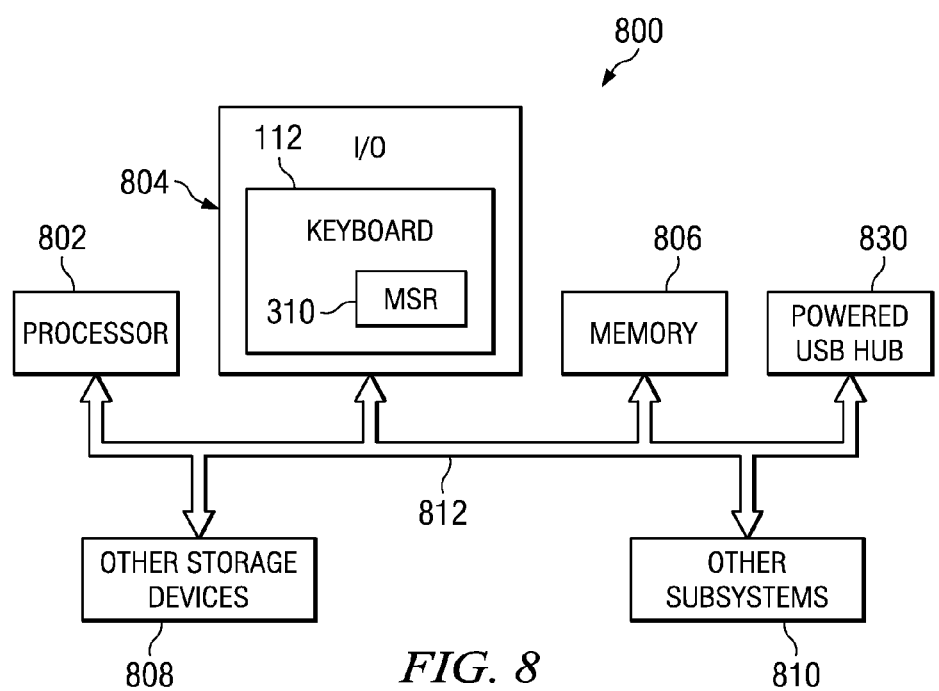
FIG. 8 shows a schematic block diagram of an information handling system for use within a point of sale terminal.

Referring briefly to FIG. 8, a system block diagram of an information handling system 800 is shown. The information handling system 800 is an example the controller system included within the point of sale terminal 100. The information handling system 800 includes a processor 802, input/output (I/O) devices 804, such as the display 114, the keyboard assembly 112 (optionally including the MSR 310) as well as a mouse and associated controllers, non-volatile memory 804 such as a hard disk and drive, and other storage devices 808, such as a floppy disk and drive and other memory devices, and various other subsystems 810, all interconnected via one or more buses 812. The information handling system 800 also includes a powered USB hub 830.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A point of sale terminal comprising:
   a terminal housing, the terminal housing including a controller portion and a cash drawer portion;
   a keyboard assembly positioned over the cash drawer portion, the keyboard assembly including a keyboard and a keyboard assembly housing, the keyboard assembly housing being sized to substantially exactly fit over the cash drawer portion, the keyboard assembly defining a keyboard recess and a magnetic stripe reader recess, the keyboard fitting snugly into the keyboard recess; and, a system controller coupled to the keyboard assembly; and wherein the keyboard assembly housing includes a plurality of keyboard cable management tabs, the keyboard cable management tabs routing a keyboard cable within the keyboard assembly housing.

2. A point of sale terminal comprising:

a terminal housing, the terminal housing including a controller portion and a cash drawer portion;

a keyboard assembly positioned over the cash drawer portion, the keyboard assembly including a keyboard and a keyboard assembly housing, the keyboard assembly housing being sized to substantially exactly fit over the cash drawer portion, the keyboard assembly defining a keyboard recess and a magnetic stripe reader recess, the keyboard fitting snugly into the keyboard recess; and, a system controller coupled to the keyboard assembly; and wherein the keyboard assembly housing includes a plurality of magnetic stripe reader (MSR) cable management tabs, the MSR cable management tabs routing a MSR cable within the keyboard assembly housing.

3. The point of sale terminal of claim 2 wherein:

the keyboard assembly housing defines a card slot, the card slot being position to allow a card to be slid through the magnetic stripe reader.

4. The point of sale terminal of claim 2 wherein:

the keyboard is a minimal edge keyboard.

5. An information handling system comprising:

a terminal housing, the terminal housing including a controller portion and a cash drawer portion;

a keyboard assembly positioned over the cash drawer portion, the keyboard assembly including a keyboard and a keyboard assembly housing, the keyboard assembly housing being sized to substantially exactly fit over the cash drawer portion, the keyboard assembly defining a keyboard recess and a magnetic stripe reader recess, the keyboard fitting snugly into the keyboard recess; and, a system controller coupled to the keyboard assembly, the system controller including a processor and memory; and wherein, the keyboard assembly housing includes a plurality of keyboard cable management tabs, the keyboard cable management tabs routing a keyboard cable within the keyboard assembly housing.

6. An information handling system comprising:

a terminal housing, the terminal housing including a controller portion and a cash drawer portion;

a keyboard assembly positioned over the cash drawer portion, the keyboard assembly including a keyboard and a keyboard assembly housing, the keyboard assembly housing being sized to substantially exactly fit over the cash drawer portion, the keyboard assembly defining a keyboard recess and a magnetic stripe reader recess, the keyboard fitting snugly into the keyboard recess; and, a system controller coupled to the keyboard assembly, the system controller including a processor and memory; and wherein, the keyboard assembly housing includes a plurality of magnetic stripe reader (MSR) cable management tabs, the MSR cable management tabs routing a MSR cable within the keyboard assembly housing.

7. The information handling system of claim 6 wherein:

the keyboard assembly housing defines a card slot, the card slot being position to allow a card to be slid through the magnetic stripe reader.

8. The information handling system of claim 6 wherein:

the keyboard is a minimal edge keyboard.

9. A keyboard assembly for use with a point of sale terminal, the keyboard assembly comprising:

a keyboard; and, a keyboard housing sized to substantially exactly fit over a cash drawer portion of the point of sale terminal, the keyboard assembly defining a keyboard recess and a magnetic stripe reader recess, the keyboard fitting snugly into the keyboard recess; and wherein the keyboard assembly housing includes a plurality of keyboard cable management tabs, the keyboard cable management tabs routing a keyboard cable within the keyboard assembly housing.

10. A keyboard assembly for use with a point of sale terminal, the keyboard assembly comprising:

a keyboard; and, a keyboard housing sized to substantially exactly fit over a cash drawer portion of the point of sale terminal, the keyboard assembly defining a keyboard recess and a magnetic stripe reader recess, the keyboard fitting snugly into the keyboard recess; and wherein the keyboard assembly housing includes a plurality of MSR cable management tabs, the MSR cable management tabs routing a MSR cable within the keyboard assembly housing.

11. The keyboard assembly of claim 10 wherein:

the keyboard assembly housing defines a card slot, the card slot being position to allow a card to be slid through the magnetic stripe reader.

12. The keyboard assembly of claim 10 wherein:

the keyboard is a minimal edge keyboard.

* * * * *

UNITED STATES PATENT AND TRADEMARK OFFICE
CERTIFICATE OF CORRECTION

PATENT NO. : 7,575,159 B2
APPLICATION NO. : 11/400847
DATED : August 18, 2009
INVENTOR(S) : Weisblatt et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 681 days.

Signed and Sealed this

Seventh Day of September, 2010

David J. Kappos
*Director of the United States Patent and Trademark Office*